United States Patent
Park et al.

(10) Patent No.: US 10,159,937 B2
(45) Date of Patent: Dec. 25, 2018

(54) PRESSURIZED HOLLOW FIBER MEMBRANE MODULE AND BACKWASHING METHOD USING SAME

(71) Applicant: Lotte Advanced Materials Co., Ltd., Yeosu-si (KR)

(72) Inventors: Pyung Kyu Park, Uiwang-si (KR); Gyu Hong Min, Uiwang-si (KR); Jong Sang Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 446 days.

(21) Appl. No.: 14/655,426

(22) PCT Filed: Oct. 31, 2013

(86) PCT No.: PCT/KR2013/009769
§ 371 (c)(1),
(2) Date: Jun. 25, 2015

(87) PCT Pub. No.: WO2014/104558
PCT Pub. Date: Jul. 3, 2014

(65) Prior Publication Data
US 2015/0352499 A1   Dec. 10, 2015

(30) Foreign Application Priority Data
Dec. 29, 2012  (KR) .................. 10-2012-0157685

(51) Int. Cl.
*B01D 63/02*   (2006.01)
*B01D 65/02*   (2006.01)

(52) U.S. Cl.
CPC ............ *B01D 63/02* (2013.01); *B01D 65/02* (2013.01); *B01D 2313/08* (2013.01); *B01D 2319/00* (2013.01); *B01D 2321/04* (2013.01)

(58) Field of Classification Search
CPC ...................................................... B01D 63/02
See application file for complete search history.

(56) References Cited

U.S. PATENT DOCUMENTS

2006/0124529 A1*  6/2006  Schott ................. B01D 53/225
                                                                    210/321.6
2014/0144830 A1*  5/2014  Isch ....................... B01D 29/52
                                                                    210/323.2

FOREIGN PATENT DOCUMENTS

CN        1973969 A      6/2007
CN      101785972 A      7/2010
(Continued)

OTHER PUBLICATIONS

International Search Report in counterpart International Application No. PCT/KR2013/009769 dated Feb. 18, 2014, pp. 1-4.
(Continued)

*Primary Examiner* — Peter Keyworth
(74) *Attorney, Agent, or Firm* — Additon, Higgins & Pendleton, P.A.

(57) ABSTRACT

The present invention relates to a pressure hollow fiber membrane module, including: a housing in which a raw water inlet, a concentrate water outlet, and a treated water outlet are formed; an inner flow path that is formed in the central portion of the housing; a plurality of hollow fiber membranes that are arranged around the inner flow path; a treated water collection unit that communicates with the inner flow path and the hollow fiber membrane; a first opening/closing unit that opens and closes an open end of the inner flow path; and a second opening/closing unit that opens and closes an open end of the hollow fiber membrane.

11 Claims, 5 Drawing Sheets

(56) References Cited

FOREIGN PATENT DOCUMENTS

| JP | 2004-216263 A | 8/2004 |
|---|---|---|
| JP | 2007-203298 A | 8/2007 |
| KR | 10-0503783 B1 | 7/2005 |
| KR | 10-2011-0021218 A | 3/2011 |
| KR | 10-2012-0007946 A | 1/2012 |
| WO | 2014/104558 A1 | 7/2014 |

OTHER PUBLICATIONS

Office Action in counterpart Chinese Application No. 2013800689215 dated Mar. 3, 2016, pp. 1-6.

* cited by examiner

PRESSURIZED HOLLOW FIBER MEMBRANE MODULE AND BACKWASHING METHOD USING SAME

CROSS-REFERENCE TO RELATED APPLICATIONS

This application claims priority to and the benefit of International Application No. PCT/KR2013/009769, filed Oct. 31, 2013, which published as WO 2014/104558 on Jul. 3, 2014, and Korean Patent Application No. 10-2012-0157685, filed in the Korean Intellectual Property Office on Dec. 29, 2012, the entire disclosure of each of which is incorporated herein by reference.

TECHNICAL FIELD

The present invention relates to a hollow fiber membrane module and a method for backwashing the hollow fiber membrane module, and more particularly, to a pressurized hollow fiber membrane module provided with a first opening/closing unit and a second opening/closing unit, and a backwashing method using the same.

BACKGROUND ART

A membrane separates materials based on size of molecules or repellency between molecules and the membrane, and drive force of separation includes pressure, concentration, potential difference, and the like. Advantageously, a membrane allows easy automation and does not involve phase change, high temperature treatment, and the like when used in a separation process, and thus has been studied and utilized as a technique capable of replacing conventional separation processes in environmental pollution prevention facilities or chemical plants.

Examples of such a membrane include a reverse osmosis membrane, a nano-filtration membrane, an ultrafiltration membrane, a microfiltration membrane, an ion exchange membrane, a gas separation membrane, a pervaporation membrane, and the like. Membrane modules are divided into plate-frame type, tubular type, spiral-wound type, and hollow-fiber type membrane modules according to the structure thereof.

Thereamong, the hollow fiber membrane module refers to a bundle of hollow fiber membranes having a shape of a long hollow thread, and includes an inside-out hollow fiber membrane module wherein filtration takes place from inside (lumen) to outside of the hollow fiber membranes and an outside-in hollow fiber membrane module wherein filtration takes place from outside to inside of the hollow fiber membranes. Further, the hollow fiber membrane modules are divided into a pressurized type and a submerged type. The pressurized type hollow fiber membrane module has a structure wherein hollow fiber membranes are placed within a pressure vessel and modularized, and is operated in an outside-in or inside-out mode unlike the submerged type hollow fiber membrane module typically operated in a suction mode.

Figure 1:
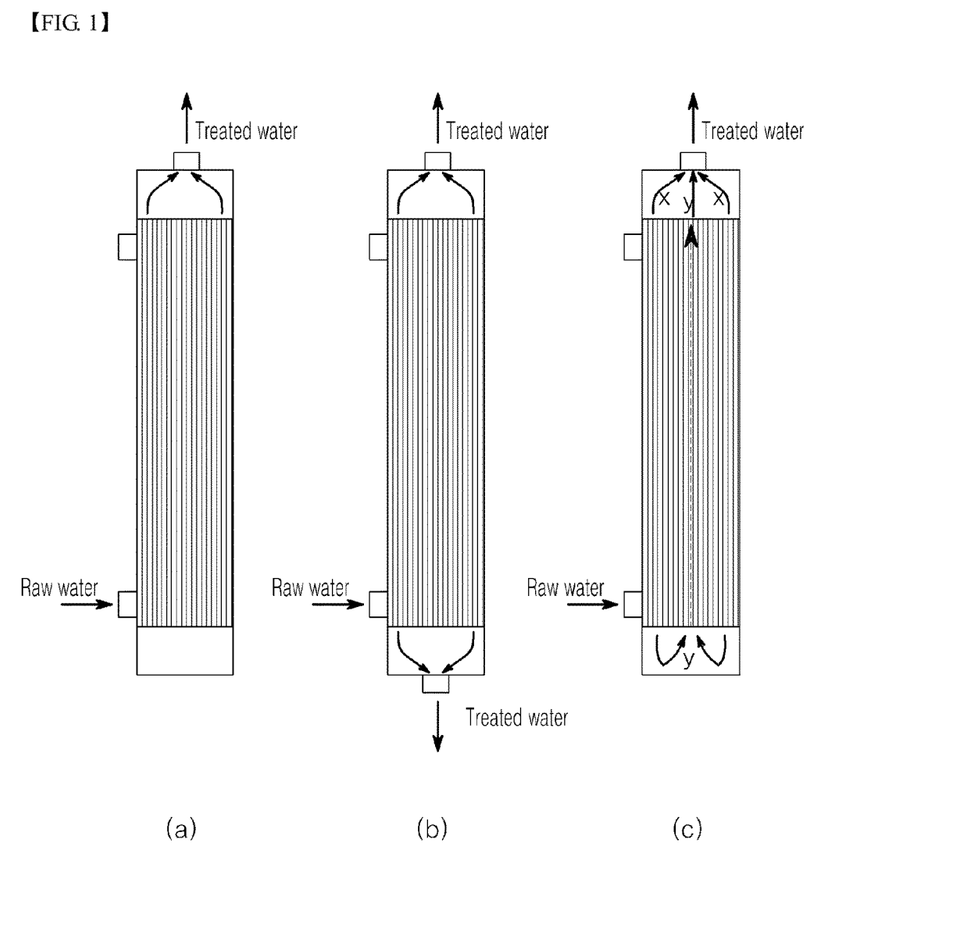
FIG. 1 shows different kinds of pressurized hollow fiber membrane modules, in which (a) is a one end-collection type module, (b) is a both end-collection type module, and (c) is a both end-collection type module provided with an internal flow path.

As shown in FIG. 1, the pressurized hollow fiber membrane module may be divided into a one end-water collection module as shown in FIG. 1(a), a both end-water collection module as shown in FIG. 1(b), and a module which actually allows treated water to be collected at both ends and is provided with an internal flow path for certain reasons, such as elimination of a need for additional piping as shown in FIG. 1(c) according to the number of treated water outlets.

The membrane suffers from deterioration in performance due to membrane fouling caused by adherence of particulates or dissolved substances to a surface of the membrane or surfaces of fine pores. In order to prevent membrane fouling, the membrane is subjected to periodic surface cleaning or backwashing so as to recover performance of the membrane during membrane filtration. Here, backwashing is performed, for example, by passing washing water through the membrane pores in a direction opposite a filtration direction. As backwashing water, filtered water or a mixture of filtered water and acids, alkalis, or cleaning agents such as inorganic and organic detergents is used. Backwashing is performed by pushing the backwashing water through a backwash pump.

In all of the pressurized hollow fiber membrane modules shown in FIG. 1, since hollow fiber membranes are placed in a long cylindrical housing in a longitudinal direction of the module, backwashing pressure is decreased in the longitudinal direction of the hollow fiber membranes during backwashing, thereby causing non-uniform distribution of pressure. In addition, even though the backwashing pressure is uniformly distributed in the longitudinal direction of the hollow fiber membranes, recovery of filtration performance of the membrane can be achieved in a non-uniform manner in the longitudinal direction of the hollow fiber membranes, since a surface layer of the hollow fiber membranes more adjacent to a backwashing water inlet contacts more backwashing water in actual backwashing. Thus, a typical one way-backwashing process has a problem of non-uniform backwashing in the longitudinal direction of the hollow fiber membranes.

DISCLOSURE

Technical Problem

It is one object of the present invention to provide a pressurized hollow fiber membrane module which allows easy backwashing.

It is another object of the present invention to provide a method for uniformly backwashing a pressurized hollow fiber membrane module in a longitudinal direction thereof.

The above and other objects of the present invention can be accomplished by the present invention described below.

Technical Solution

One aspect of the invention relates to a pressurized hollow fiber membrane module provided with a first opening/closing unit and a second opening/closing unit. The pressurized hollow fiber membrane module includes: a housing formed with a raw water inlet, a concentrated water outlet, and a treated water outlet; an internal flow path formed in the center of the housing; a plurality of hollow fiber membranes arranged around the internal flow path; a treated water collecting portion communicating with the internal flow path and the hollow fiber membranes; a first opening/closing unit opening or closing an open end of the internal flow path; and a second opening/closing unit opening or closing open ends of the hollow fiber membranes.

The raw water inlet and the concentrated water outlet may be formed at one side of the housing, and the treated water outlet may be formed at one or the other end of housing.

The first opening/closing unit may open or close the open end of the internal flow path into which backwashing water injected through the treated water outlet is introduced in backwashing of the module.

The second opening/closing unit may open or close the open ends of the hollow fiber membranes into which backwashing water injected through the treated water outlet is introduced in backwashing of the module.

The treated water collecting portion may include a first treated water collecting portion formed at an upper portion of the housing and a second treated water collecting portion formed at a lower portion of the housing.

Another aspect of the present invention relates to a method for backwashing the pressurized hollow fiber membrane module. The method includes: a first backwashing step including closing the open end of the internal flow path by the first opening/closing unit, injecting backwashing water into the housing through the treated water outlet, introducing the injected backwashing water into the open ends of the hollow fiber membranes via the first treated water collecting portion and filtering the backwashing water through pores of the hollow fiber membrane, and discharging the filtered backwashing water outside through the concentrated water outlet; and a second backwashing step including closing the open ends of the hollow fiber membranes by the second opening/closing unit, injecting backwashing water into the housing through the treated water outlet, introducing the injected backwashing water into the open end of the internal flow path and reintroducing the backwashing water into the open ends of the hollow fiber membranes opposite the closed open ends thereof via the internal flow path and the second treated water collecting portion and filtering the backwashing water through the pores of the hollow fiber membranes, and discharging the filtered backwashing water outside through the concentrated water outlet.

The first backwashing step and the second backwashing step may be alternately performed.

The second opening/closing unit may open a hollow fiber membrane flow path when the first opening/closing unit closes the internal flow path, and the first opening/closing unit may open the internal flow path when the second opening/closing unit closes the hollow fiber membrane flow path.

The pressurized hollow fiber membrane module may be an inside-out hollow fiber membrane module.

The pressurized hollow fiber membrane module may be an outside-in hollow fiber membrane module.

Each of the first backwashing step and the second backwashing step may be performed for about 10 seconds to about 1 minute.

Advantageous Effects

The present invention provides a pressurized hollow fiber membrane module allowing easy backwashing, and a backwashing method using the same capable of uniformly backwashing the pressurized hollow fiber membrane module in a longitudinal direction of the module.

BEST MODE

Hereinafter, embodiments of the present invention will be described in detail with reference to the accompanying drawings. It should be understood that the present invention is not limited to the following embodiments and may be embodied in different ways, and that the following embodiments are given to provide complete disclosure of the invention and to provide thorough understanding of the invention to those skilled in the art. It should be noted that the drawings are not to precise scale and some of the dimensions, such as width, length, thickness, and the like, are exaggerated for clarity of description in the drawings. Although some elements are illustrated in the drawings for convenience of description, other elements will be easily understood by those skilled in the art. It should be noted that all of the drawings are described from the viewpoint of the observer. It will be understood that, when an element is referred to as being "on" another element, the element can be directly formed on the other element, or intervening element(s) may also be present therebetween. In addition, it should be understood that the present invention may be embodied in different ways by those skilled in the art without departing from the scope of the present invention. Like components will be denoted by like reference numerals throughout the drawings.

As used herein, terms such as "upper" and "lower" are defined with reference to the accompanying drawings. Thus, it will be understood that the term "upper side" can be used interchangeably with the term "lower side".

A pressurized hollow fiber membrane module according to the present invention may be a both end-water collection type hollow fiber membrane module which is provided with an internal flow path, as shown in FIG. 1(c).

Figure 2:
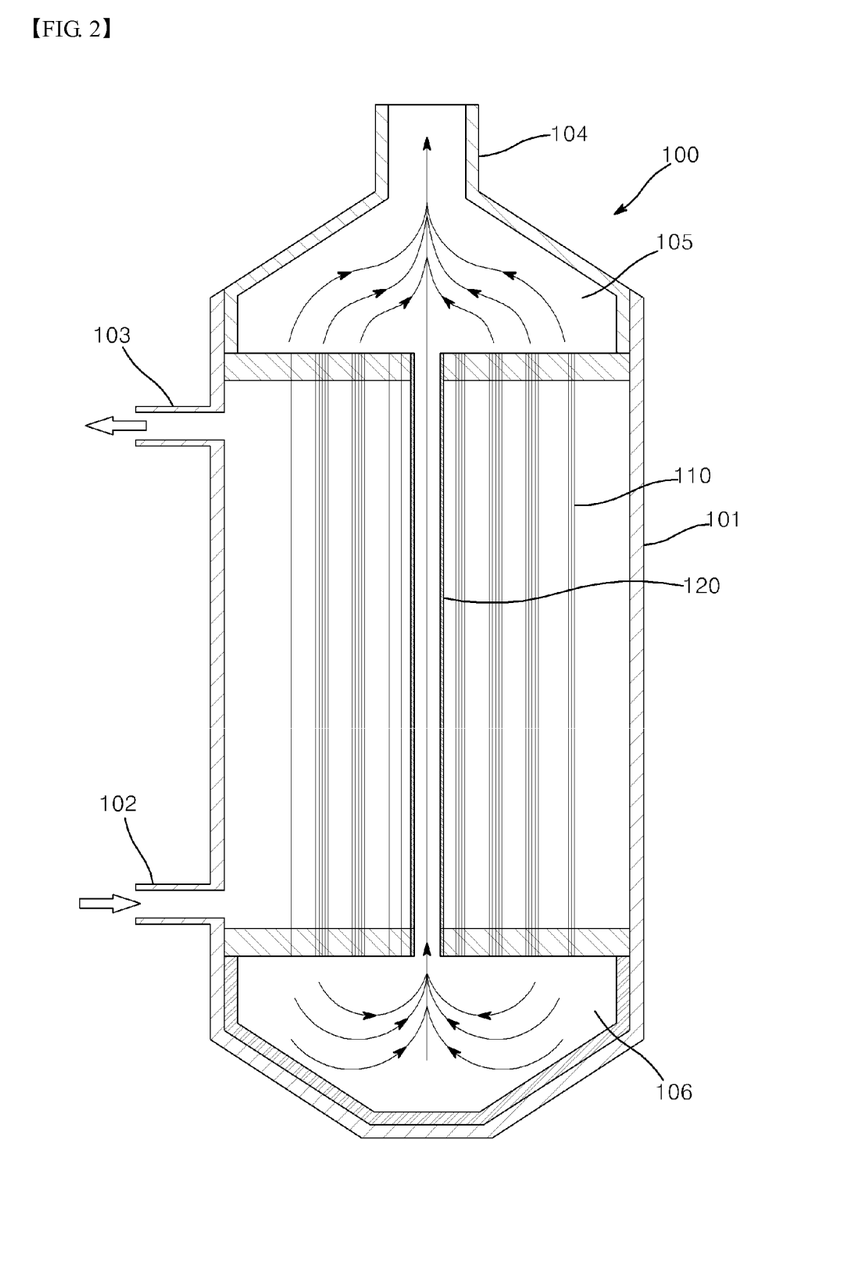
FIG. 2 is a schematic sectional view of a hollow fiber membrane module, illustrating a filtration principle of an outside-in hollow fiber membrane module.

FIG. 2 is a view illustrating a filtration principle of an outside-in hollow fiber membrane module. The outside-in hollow fiber membrane module includes: a housing 101 formed with a raw water inlet 102, a concentrated water outlet 103, a treated water outlet 104, and first and second treated water collecting portions 105, 106; a plurality of hollow fiber membranes 110 potted within the housing; and an internal flow path 120 formed in the center of the housing and allowing treated water filtered at a lower end of the module to be recovered therethrough. A surface of the hollow fiber membrane is formed with a number of fine pores. The filtration principle of the module is as follows: raw water injected through the inlet 102 is filtered through the pores of the hollow fiber membranes 110, and then the filtered treated water is collected in the first treated water collecting portion 105 formed at an upper portion of the housing and the second treated water collecting portion 106 formed at a lower portion of the housing. Treated water collected in the first treated water collecting portion 105 is discharged outside through the outlet 104, and treated water collected in the second treated water collecting portion 106 is passed to the outlet 104 via the internal flow path 120 and discharged outside through the outlet.

In addition, unfiltered concentrated water may be discharged outside through the concentrated water outlet 103, or all of introduced raw water may be completely filtered to be discharged as treated water without discharging unfiltered concentrated water.

A pressurized hollow fiber membrane module according to the present invention is provided with a first opening/closing unit and a second opening/closing unit in order to allow alternating washing of an upper end and a lower end of the module to be easily achieved.

The pressurized hollow fiber membrane module may include: a housing formed with a raw water inlet, a concentrated water outlet, and a treated water outlet; an internal flow path formed in the center of the housing; a treated water collecting portion formed inside the housing and communicating with the internal flow path; a plurality of hollow fiber membranes arranged around the internal flow path; the first opening/closing unit opening or closing an open end of the internal flow path; and the second opening/closing unit opening or closing open ends of the hollow fiber membranes.

The raw water inlet and the concentrated water outlet may be formed at one side of the housing, and the treated water outlet may be formed at an upper or lower end of the housing. In one embodiment, as shown in FIG. 2, the raw water inlet, the concentrated water outlet, and the treated water outlet may be formed at a lower end of one side of the housing, at an upper end of the one side of the housing, and at an upper end of the housing, respectively.

The housing is formed therein with the treated water collecting portion in which treated water having been filtered through the hollow fiber membranes is collected. The treated water collecting portion may be formed at each of an upper portion and a lower portion of the housing, and may communicate with the open ends of the internal flow path and the hollow fiber membranes.

The first opening/closing unit may open or close the open end of the internal flow path into which backwashing water injected through the treated water outlet is introduced in backwashing of the module, and the second opening/closing unit may open or close the open ends of the hollow fiber membranes into which backwashing water injected through the treated water outlet is introduced in backwashing of the module.

The housing may have a cylindrical shape; the internal flow path may be formed in the longitudinal direction of the housing; and the plurality of the hollow fiber membranes may be arranged around the internal flow path.

As used herein, the internal flow path refers to a path through which treated water having been collected at the lower end of the module is collected at the upper end of the module, or backwashing water is delivered to the lower end of the module. In addition, the open end of the internal flow path refers to an open section of the internal flow path through which backwashing water injected through the treated water outlet is first introduced into the internal flow path. Similarly, the open ends of the hollow fiber membranes refer to open sections of unit hollow fiber membranes, through which injected backwashing water is first introduced into the hollow fiber membranes, or an area occupied by such open sections of all of the hollow fiber membranes.

A method for backwashing the pressurized hollow fiber membrane module according to the present invention includes: a first backwashing step including closing the open end of the internal flow path by the first opening/closing unit, injecting backwashing water into the housing through the treated water outlet, introducing the injected backwashing water into the open ends of the hollow fiber membranes and filtering the backwashing water through the pores of the hollow fiber membranes, and discharging the filtered backwashing water outside through the concentrated water outlet; and a second backwashing step including closing the open ends of the hollow fiber membranes by the second opening/closing unit, injecting backwashing water into the housing through the treated water outlet, introducing the injected backwashing water into the open end of the internal flow path and reintroducing the backwashing water into open ends of the other end-hollow fiber membranes opposite the closed open ends thereof via the internal flow path and the treated water collecting portion and filtering the backwashing water through the pores of the hollow fiber membranes, and discharging the filtered backwashing water outside through the concentrated water outlet.

Figure 3:
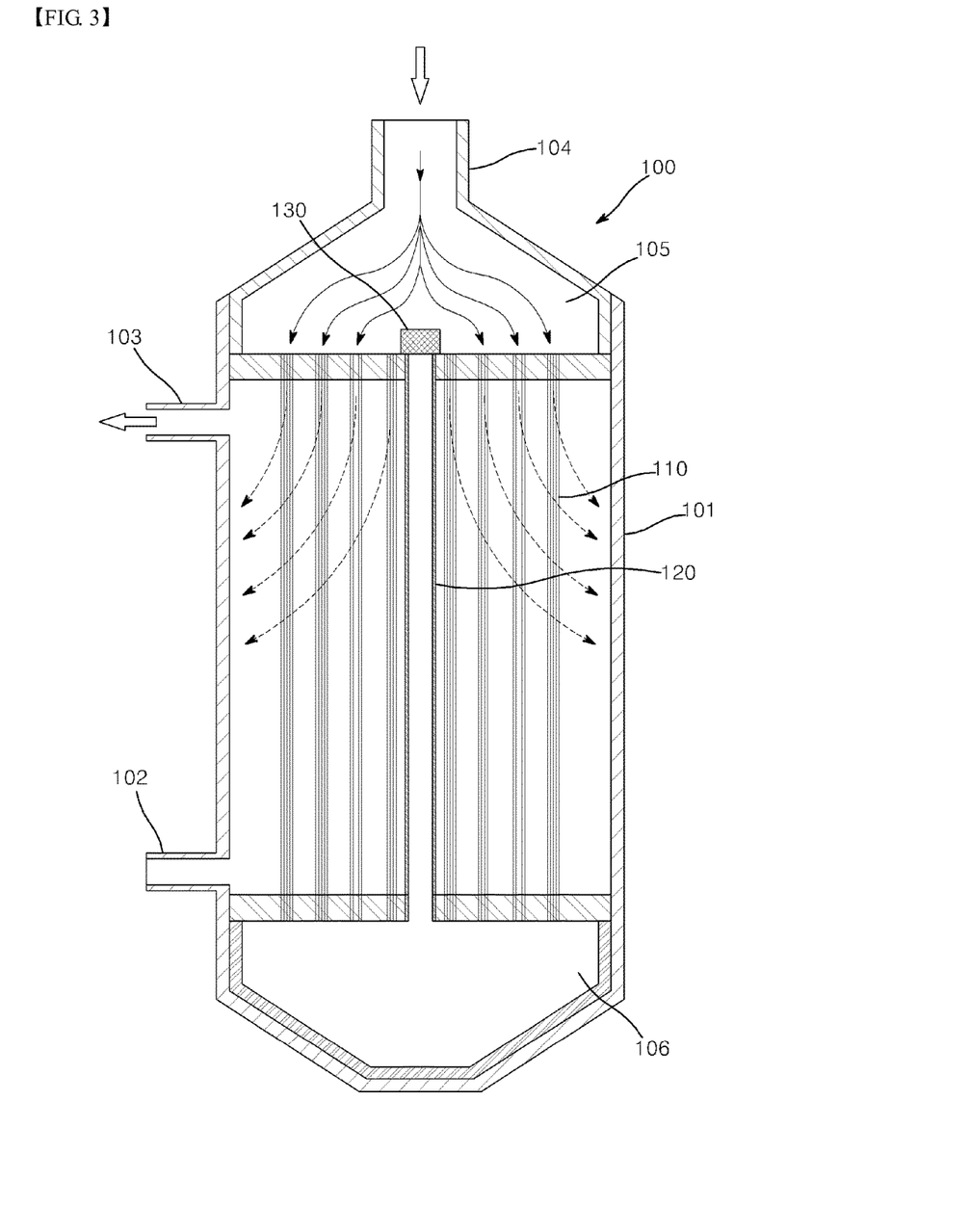
FIG. 3 is a schematic sectional view of a hollow fiber membrane module, illustrating a first backwashing step using an outside-in hollow fiber membrane module according to one embodiment of the present invention.
Figure 4:
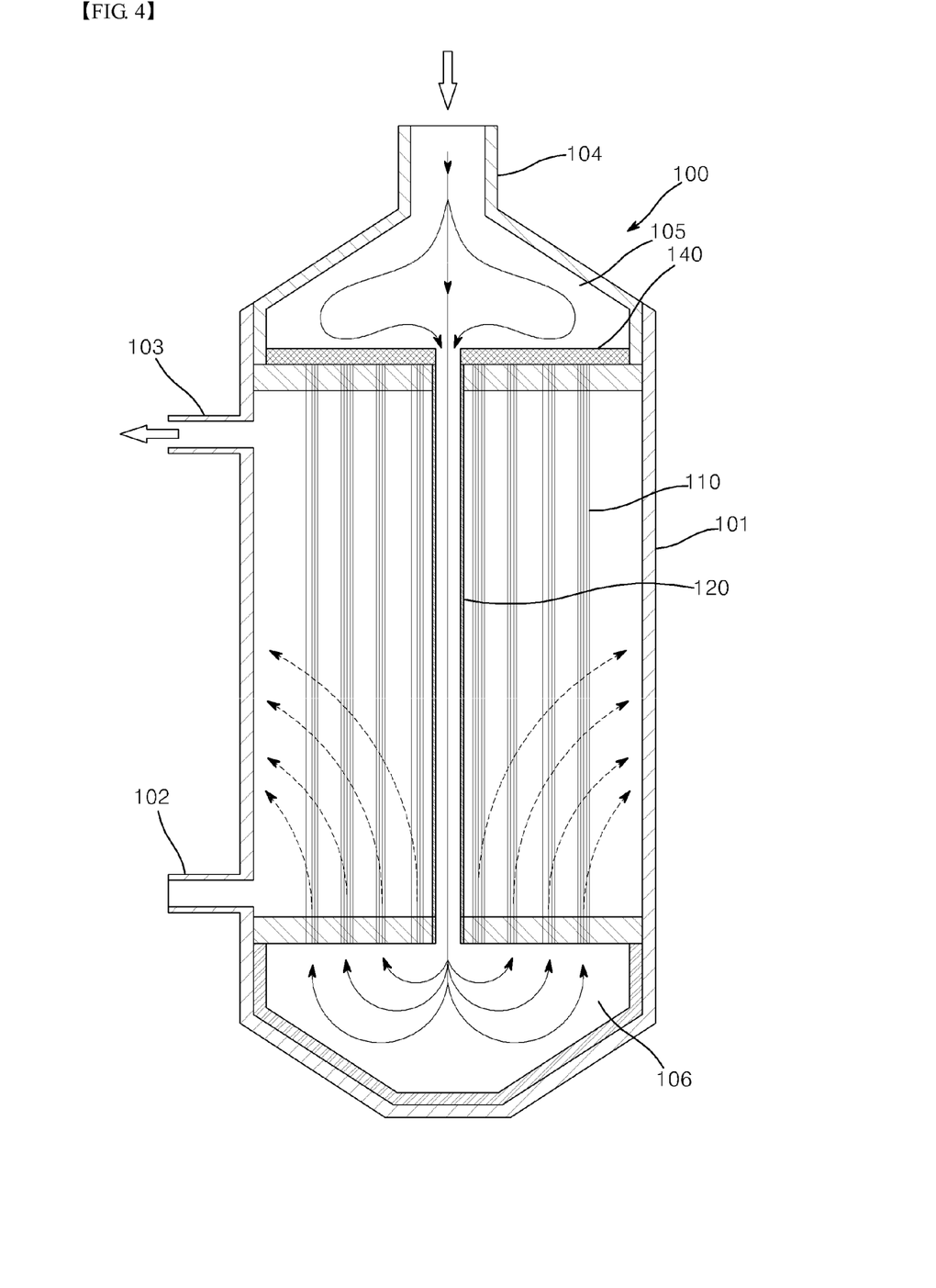
FIG. 4 is a schematic sectional view of the hollow fiber membrane module, illustrating a second backwashing step using the outside-in hollow fiber membrane module according to the embodiment of the present invention.

Next, the method for backwashing an outside-in hollow fiber membrane module according to one embodiment of the present invention will be described. The treated water outlet 104 of the hollow fiber membrane module corresponds to a backwashing water inlet, and the concentrated water outlet corresponds to a backwashing water outlet. FIGS. 3 and 4 are sectional views of the outside-in hollow fiber membrane module according to the present invention. In the method for backwashing the hollow fiber membrane module, the first backwashing step for the upper end of the module and the second backwashing step for the lower end of the module may be alternately performed.

First, the first backwashing step for backwashing the upper end of the hollow fiber membrane module will be described with reference to FIG. 3. After the raw water inlet 102 is closed and the open end of the internal flow path is closed by the first opening/closing unit 130, backwashing water is injected through the treated water outlet 104. The injected backwashing water is only introduced into the open ends of the hollow fiber membranes via the first treated water collecting portion 105 since an entrance into the internal flow path is blocked. The backwashing water introduced into the hollow fiber membranes is filtered through the pores of the hollow fiber membranes and simultaneously escapes from the hollow fiber membranes while removing particulates or dissolved substances adhering to surfaces of the hollow fiber membranes or surfaces of the pores. However, despite closing the open end of the internal flow path by the first opening/closing unit, backwashing pressure is decreased from the upper end towards the lower end of the module, and the upper end contacts more water than the lower end of the module. Thus, relatively easy recovery of filtration performance can be achieved at the upper end of the module as compared with at the lower end of the module.

Next, the second backwashing step for backwashing the lower end of the hollow fiber membrane module will be described with reference to FIG. 4. After the raw water inlet 102 is closed and the open ends of the hollow fiber membranes is closed by the second opening/closing unit 140 to block backwashing water from entering the hollow fiber membranes, backwashing water is injected through the treated water outlet 104. The injected backwashing water is collected in the second treated water collecting portion 106 via the internal flow path. The collected backwashing water is introduced into the hollow fiber membranes from the lower portion towards the upper portion of the module by backwashing pressure. The introduced backwashing water is mainly filtered through the pores at the lower end of the module due to pressure drop simultaneously while removing particulates or dissolved substances adhering to surfaces of the hollow fiber membranes or surfaces of the pores. Thus, relatively effective backwashing can be achieved at the lower end of the module as compared with at the upper end of the module.

In both of the first and second backwashing steps, the filtered backwashing water is discharged outside through the backwashing water outlet 103.

Each of the first and second backwashing steps may be performed for about 10 seconds to about 1 minute, and may be alternately performed. However, when the upper end of the hollow fiber membrane module exhibits a different degree of contamination than the lower end of the module, for example, when the upper end of the hollow fiber membrane module exhibits a higher degree of contamination than the lower end of the module, the duration of the first backwashing step may be longer than that of the second backwashing step in performing the first and second backwashing steps in an alternate manner.

When the first and second backwashing steps are alternately performed, the second opening/closing unit may open the open ends of the hollow fiber membranes when the first opening/closing unit closes the open end of the internal flow path, and the first opening/closing unit may open the open end of the internal flow path when the second opening/closing unit closes the open ends of the hollow fiber membranes.

Figure 5:
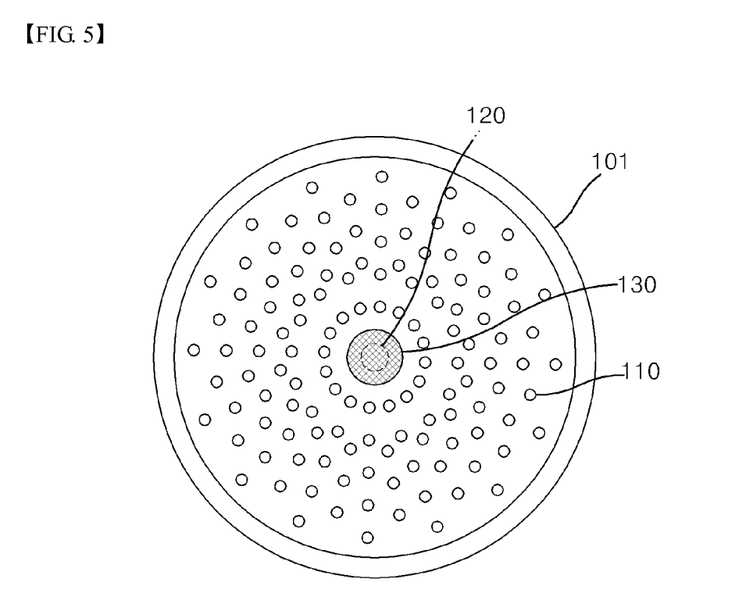
FIG. 5 is a sectional view of the hollow fiber membrane module provided with a first opening/closing unit.

FIG. 5 is a sectional view of the module, with the open end of the internal flow path 120 closed by the first opening/closing unit 130 in the first backwashing step. Here, backwashing water is only introduced into the open ends of the hollow fiber membranes 110, since the open end of the internal flow path is closed. The first opening/closing unit 130 may include any suitable means capable of closing the open end of the internal flow path without limitation, and may be used alone or in the form of being associated with the second opening/closing unit. Further, the first opening/closing unit may be a manual opening/closing unit or an automatic opening/closing unit under the control of an external controller.

Figure 6:
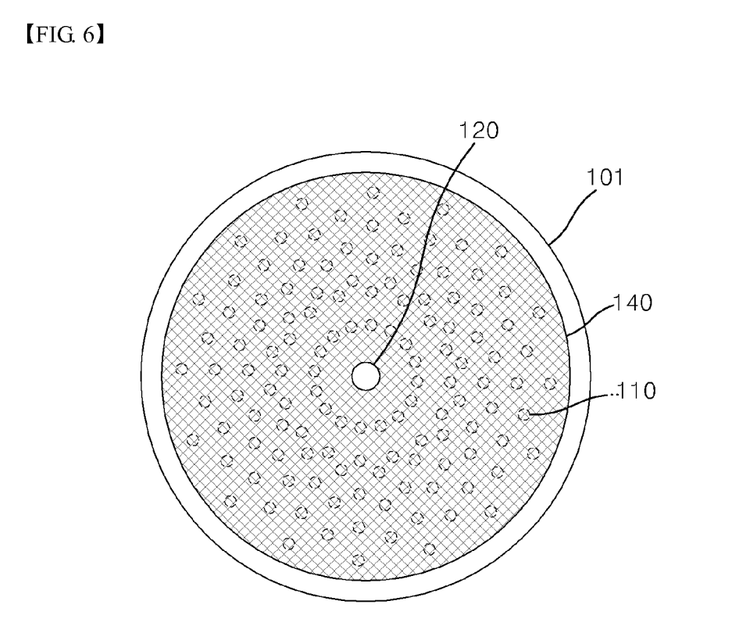
FIG. 6 is a sectional view of the hollow fiber membrane module provided with a second opening/closing unit.

FIG. 6 is a sectional view of the module, with the open ends of the hollow fiber membranes 110, through which backwashing water is introduced into the hollow fiber membranes, closed by the second opening/closing unit 140 in the second backwashing step. Here, backwashing water is only introduced into the internal flow path 120, since the open ends of the hollow fiber membranes are closed. Similarly, the second opening/closing unit 140 may include any suitable means capable of closing the open ends of the hollow fiber membranes without limitation, and may be used alone or in the form of being associated with the first opening/closing unit. Further, the second opening/closing unit may be a manual opening/closing unit or an automatic opening/closing unit under the control of an external controller.

It should be understood that various modifications, changes, alterations, and equivalent embodiments can be made by those skilled in the art without departing from the spirit and scope of the invention.

The invention claimed is:

1. A pressurized hollow fiber membrane module comprising:
   a housing formed with a raw water inlet, a concentrated water outlet, and a treated water outlet;
   an internal flow path formed in the center of the housing, an end of the internal flow path having an opening;
   a plurality of hollow fiber membranes arranged around the internal flow path, ends of the hollow fiber membranes respectively having openings;
   a treated water collecting portion communicating with the internal flow path and the hollow fiber membranes;
   a first opening/closing unit configured to both open and close the opening of the end of the internal flow path; and
   a second opening/closing unit configured to both open and close the openings of the ends of the hollow fiber membranes,
   wherein the first opening/closing unit is configured to open the opening of the end of the internal flow path so that backwashing water injected through the treated water outlet is introduced into the opening of the end of the internal flow path during backwashing of the module.

2. The pressurized hollow fiber membrane module according to claim 1, wherein the raw water inlet and the concentrated water outlet are formed at one side of the housing, and the treated water outlet is formed at one or the other end of housing.

3. The pressurized hollow fiber membrane module according to claim 1, wherein the second opening/closing unit is configured to open the openings of the ends of the hollow fiber membranes so that backwashing water injected through the treated water outlet is introduced into the openings of the ends of the hollow fiber membranes during backwashing of the module.

4. The pressurized hollow fiber membrane module according to claim 1, wherein the treated water collecting portion comprises a first treated water collecting portion formed at an upper portion of the housing and a second treated water collecting portion formed at a lower portion of the housing.

5. A method for backwashing the pressurized hollow fiber membrane module according to claim 1, wherein the treated water collecting portion comprises a first treated water collecting portion and a second treated water collecting portion, the ends of the hollow fiber membranes are first ends of the hollow fiber membranes, the hollow fiber membrane include opposite second ends, and the method comprises:
   a first backwashing step comprising:
      closing, with the first opening/closing unit, the opening of the end of the internal flow path,
      injecting backwashing water into the housing through the treated water outlet,
      introducing the injected backwashing water into the openings of the first ends of the hollow fiber membranes via the first treated water collecting portion, and filtering the backwashing water through pores of the hollow fiber membranes, and
      discharging the filtered backwashing water outside through the concentrated water outlet; and
   a second backwashing step comprising:
      closing, with the second opening/closing unit, the openings of the first ends of the hollow fiber membranes,
      injecting backwashing water into the housing through the treated water outlet,
      introducing the injected backwashing water into the opening of the end of the internal flow path and reintroducing the backwashing water into openings respectively of the second ends of the hollow fiber membranes via the internal flow path and the second treated water collecting portion, and filtering the backwashing water through pores of the hollow fiber membranes, and discharging the filtered backwashing water outside through the concentrated water outlet.

6. The method according to claim 5, wherein the first backwashing step and the second backwashing step are alternately performed.

7. The method according to claim 5, wherein the second opening/closing unit opens a hollow fiber membrane flow path when the first opening/closing unit closes the internal flow path, and the first opening/closing unit opens the internal flow path when the second opening/closing unit closes the hollow fiber membrane flow path.

8. The method according to claim 5, wherein the pressurized hollow fiber membrane module is an inside-out hollow fiber membrane module.

9. The method according to claim 5, wherein the pressurized hollow fiber membrane module is an outside-in hollow fiber membrane module.

10. The method according to claim 5, wherein each of the first backwashing step and the second backwashing step is performed for about 10 seconds to about 1 minute.

11. The method according to claim 5, wherein the first treated water collecting portion is positioned at an upper portion of the housing, and the second treated water collecting portion is positioned at a lower portion of the housing.

* * * * *